United States Patent
Matsumoto

(10) Patent No.: US 8,793,454 B2
(45) Date of Patent: Jul. 29, 2014

(54) INFORMATION PROCESSING APPARATUS AND METHOD OF CONTROLLING THE SAME

(75) Inventor: Akihiro Matsumoto, Kawasaki (JP)

(73) Assignee: Canon Kabushiki Kaisha (JP)

( * ) Notice: Subject to any disclaimer, the term of this patent is extended or adjusted under 35 U.S.C. 154(b) by 106 days.

(21) Appl. No.: 13/488,656

(22) Filed: Jun. 5, 2012

(65) Prior Publication Data

US 2012/0311254 A1  Dec. 6, 2012

(30) Foreign Application Priority Data

Jun. 6, 2011  (JP) .................. 2011-126702

(51) Int. Cl.
*G06F 12/16* (2006.01)
*G06F 11/20* (2006.01)

(52) U.S. Cl.
CPC .................. *G06F 11/2056* (2013.01)
USPC ......................................................... 711/162

(58) Field of Classification Search
None
See application file for complete search history.

(56) References Cited

U.S. PATENT DOCUMENTS

| 7,738,359 | B1 * | 6/2010 | Suryaputra et al. | 370/216 |
| 8,380,950 | B2 * | 2/2013 | Kulkarni | 711/162 |
| 2002/0007447 | A1 * | 1/2002 | Oue | 711/162 |
| 2005/0114728 | A1 * | 5/2005 | Aizawa et al. | 714/6 |
| 2007/0067670 | A1 * | 3/2007 | Ebsen et al. | 714/7 |

FOREIGN PATENT DOCUMENTS

JP  2008251129 A  10/2008

* cited by examiner

*Primary Examiner* — Hiep Nguyen

(74) *Attorney, Agent, or Firm* — Rossi, Kimms & McDowell LLP

(57) ABSTRACT

An extended command is defined in compliance with the ATA standard. A selection number for selecting one of HDDs, one or more designated ATA commands, and an accessible time period including an available count are added to the extended command. As a result, designated normal ATA commands can access a certain one of the HDDs for a certain time period.

12 Claims, 7 Drawing Sheets

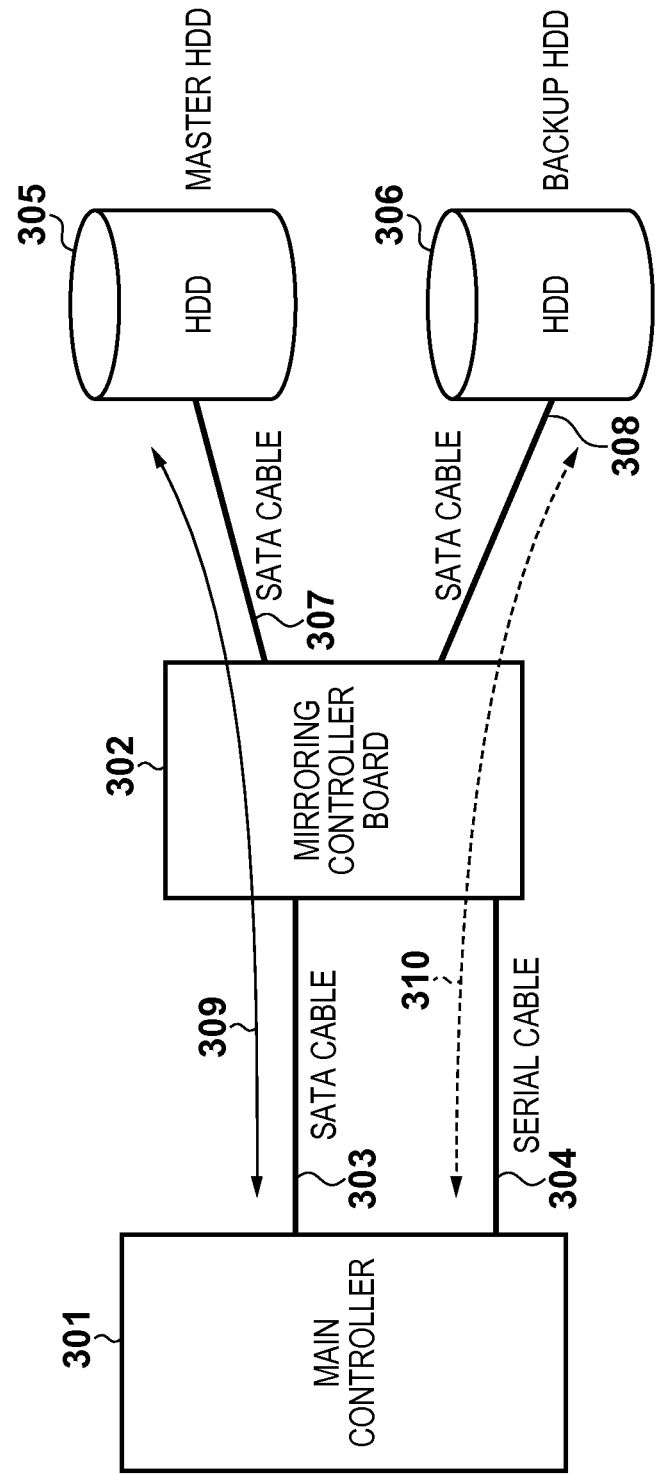

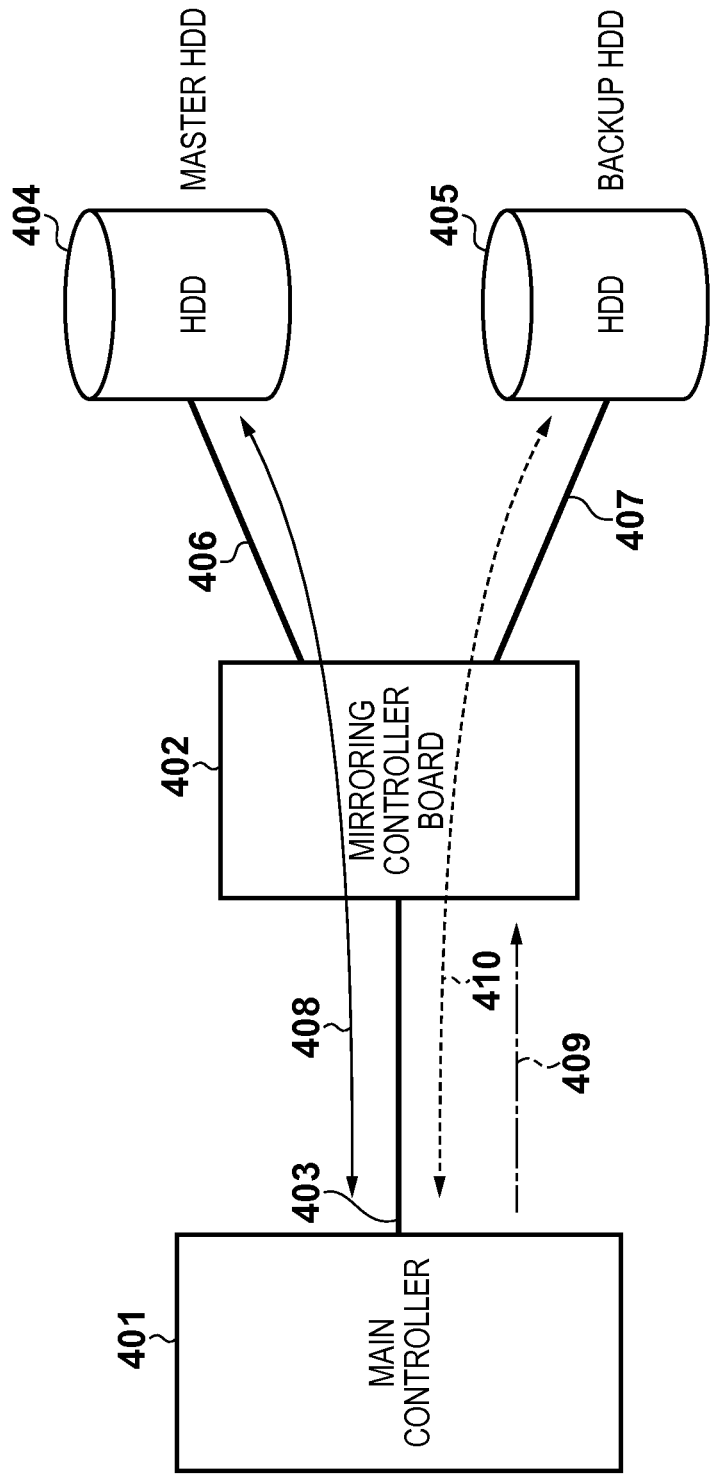

FIG. 6
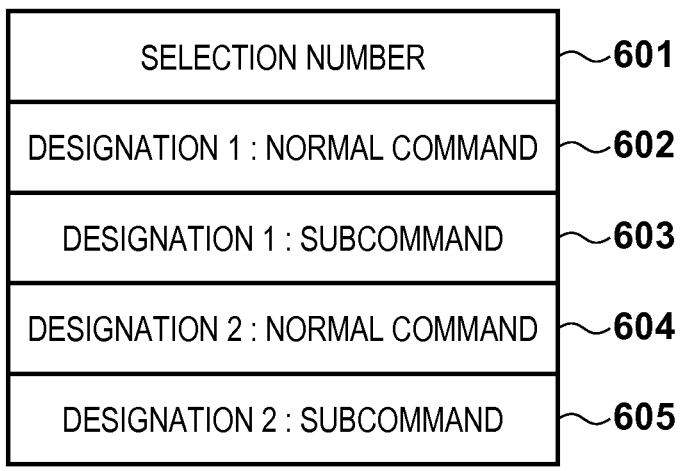
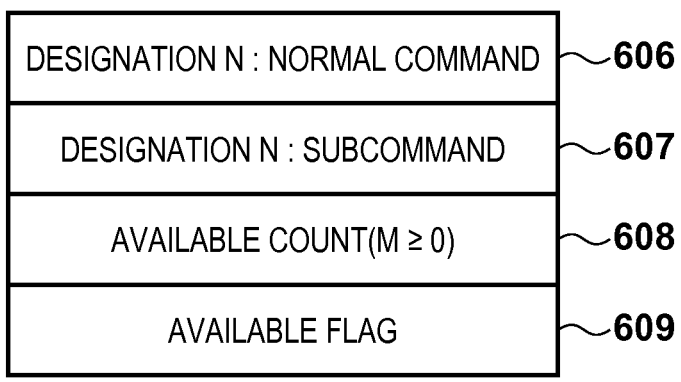

INFORMATION PROCESSING APPARATUS AND METHOD OF CONTROLLING THE SAME

BACKGROUND OF THE INVENTION

1. Field of the Invention

The present invention relates to an information processing apparatus equipped with a plurality of storage devices and to a method of controlling the same.

2. Description of the Related Art

There are storage devices compliant with the serial advanced technology attachment (SATA) standard. Representative examples of such storage devices include hard disk drives ("HDDs") and solid-state drives ("SSDs"). With the use of a group of information acquisition commands (e.g., IDENTIFY DEVICE command and SMART command) and a group of security commands (e.g., SECURITY SET PASSWORD command and SECURITY UNLOCK command), these storage devices can implement security measures by means of fault prediction for the storage devices and a password.

Furthermore, in order to increase processing speed and improve reliability, a plurality of HDDs or SDDs may be used to apply a technique called redundant arrays of independent disks (RAID), such as striped and mirrored RAIDS.

In a system including a plurality of storage devices as described above, it is required that each of the storage devices be accessible on an individual basis to realize security by means of fault prediction and a password. Now, in a product setup of a storage device, in which an apparatus A is connected to an optional RAID apparatus B, the apparatus A and the apparatus B may be connected via a single SATA-IF (cable) defined by the SATA standard. Moreover, the apparatus B and a plurality of storage devices (e.g., HDDs) may be connected via a plurality of SATA-IFs (cables). In this case, the apparatus A acknowledges the optional RAID apparatus B as one master storage device, and the optional RAID apparatus B controls the plurality of storage devices.

Therefore, the apparatus A, which serves as a host according to the SATA standard, can normally access only the master storage device and cannot access other storage devices. This renders security enhancements by means of fault prediction and a password incomplete.

For example, Japanese Patent Laid-Open No. 2008-251129 (D1) suggests providing a dedicated communication line separately from the SATA IFs (cables) in a state where the apparatus A and the apparatus B are connected in the above-described manner. Indeed, the technique described in D1 is effective when a real-time performance is required such as for retraction of a head upon detecting a crash of an HDD. The technique described in D1 also enables communication between the apparatus A, the apparatus B, and the plurality of storage devices via the dedicated communication line. This allows acquiring information from each individual storage device and configuring the settings of each individual storage device.

However, when the real-time performance mentioned in D1 is not required, the technique described in D1 gives rise to the problems of a cost increase, complicated control, a troublesome assembly process, and so on, due to the dedicated communication line.

SUMMARY OF THE INVENTION

An aspect of the present invention is to eliminate the above-mentioned problems with the conventional technology.

The present invention aims to provide technology that allows acquiring information from each individual storage device and configuring the settings of each individual storage device by using an ordinary interface compliant with the ATA standard.

According to an aspect of the present invention, there is provided an information processing apparatus equipped with a plurality of storage devices compliant with an advanced technology attachment (ATA) standard, the information processing apparatus comprising: a control unit configured to control the plurality of storage devices; a setting unit configured to set at least a selection number and one or more types of normal commands in a unique extended command defined in compliance with the ATA standard, the selection number specifying one of the plurality of storage devices; and a condition setting unit configured to set, in the extended command, a condition for accessing the one storage device specified by the selection number, wherein the control unit includes: a holding unit configured to receive the extended command and hold settings contained in the extended command; and a transmission unit configured to, upon receiving any of the normal commands, determine whether or not the condition held in the holding unit is satisfied, and if it is determined that the condition is satisfied, transmit the received normal command to the one storage device specified by the selection number, and if it is determined that the condition is not satisfied, transmit the received normal command to another one of the plurality of storage devices serving as a master.

According to another aspect of the present invention, there is provided a control method for controlling an information processing apparatus equipped with a plurality of storage devices compliant with an advanced technology attachment (ATA) standard, the control method comprising: a setting step of setting at least a selection number and one or more types of normal commands in a unique extended command defined in compliance with the ATA standard, the selection number specifying one of the plurality of storage devices; a condition setting step of setting, in the extended command, a condition for accessing the one storage device specified by the selection number; a holding step of receiving the extended command and holding settings contained in the extended command; and a transmission step of, upon receiving any of the normal commands, determining whether or not the condition held in the holding step is satisfied, and if it is determined that the condition is satisfied, transmitting the received normal command to the one storage device specified by the selection number, and if it is determined that the condition is not satisfied, transmitting the received normal command to another one of the plurality of storage devices serving as a master.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 depicts a view illustrating an example of the structure in which a mirroring system is constructed using two HDDs.

FIG. 4 depicts a view illustrating a mirroring system pertaining to the embodiment.

FIG. 6 depicts a view illustrating examples of register values defined in an extended command.

DESCRIPTION OF THE EMBODIMENTS

Embodiment of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

In the present embodiment, a multi function peripheral (MFP) is described as one example of an information processing apparatus pertaining to the present invention.

Figure 1:
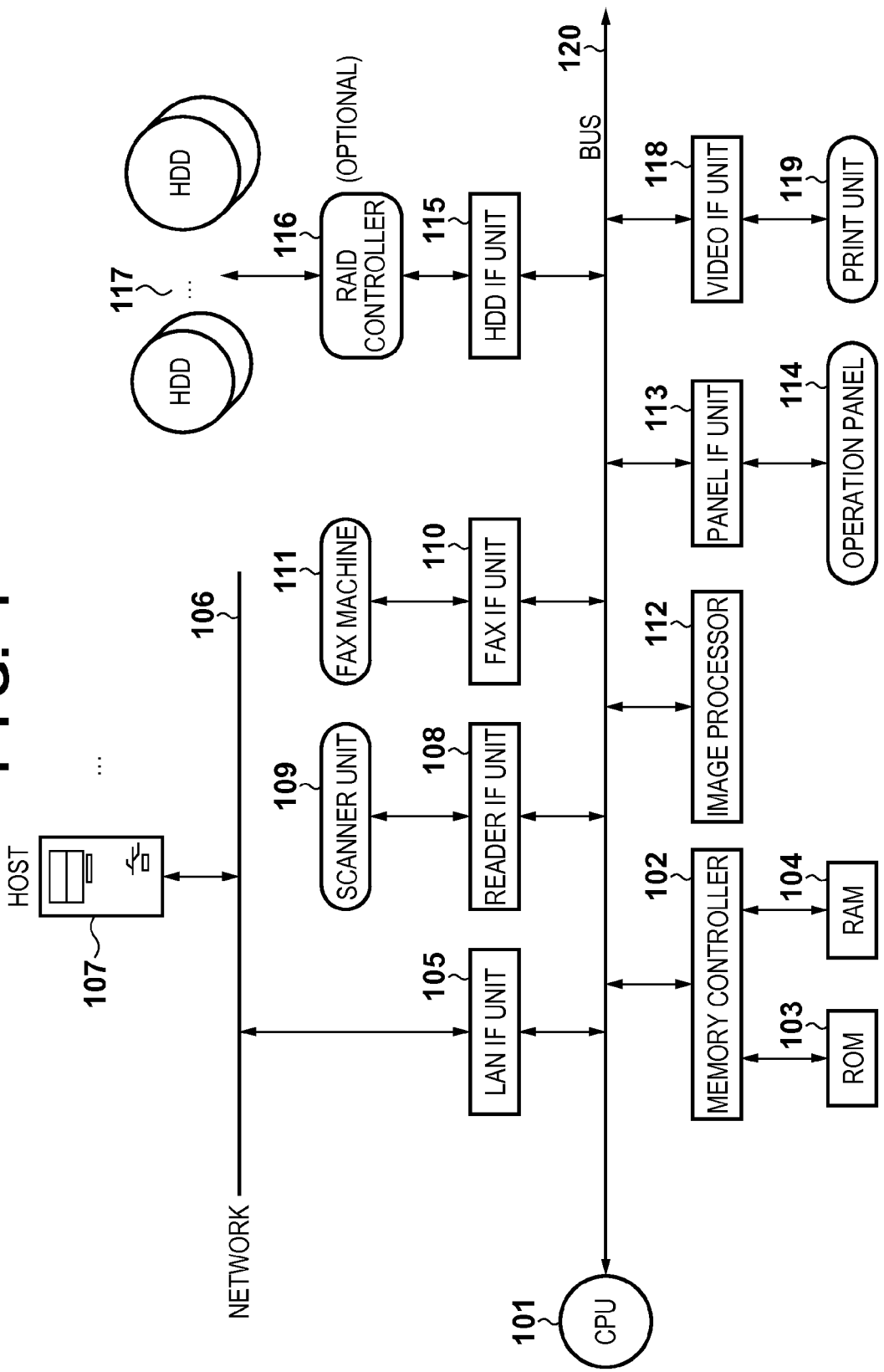
FIG. 1 is a block diagram showing the structure of a multi function peripheral (MFP) pertaining to an embodiment of the present invention, with a focus on the structure of a main controller.

FIG. 1 is a block diagram showing the structure of the MFP pertaining to the present embodiment, with a focus on the structure of a main controller.

A central processing unit (CPU) 101 performs system control and calculation processing. A memory controller 102 controls input, output, and direct memory access (DMA) with respect to various types of memory devices. A read-only memory (ROM) 103 stores a boot program, various types of processing/control programs, and control parameters. Representative examples of the ROM 103 include flash memories. A random-access memory (RAM) 104 is rewritable memory and is used as a work area for programs, a storage area for print data, and the like. Representative examples of the RAM 104 include double-data-rate (DDR) memories.

A local area network interface (LAN IF) unit 105 serves as an interface between the MFP and a LAN 106 connected to the MFP. Commonly, the LAN IF unit 105 is connected via a network cable to an apparatus that performs communication via the network, such as an external host computer 107, using the TCP/IP protocol. The LAN IF unit 105 receives print data via the network and performs printing. A reader interface (IF) unit 108 controls communication with a scanner unit 109, and realizes a copy function by inputting image data obtained through the scanning performed by the scanner unit 109. A facsimile interface (FAX IF) unit 110 controls communication with a FAX machine 111 connected to a telephone line, and exchanges data with the FAX machine 111. An image processor 112 performs various types of image processing on image data obtained via the LAN IF unit 105, the reader IF unit 108, and the FAX IF unit 110.

A panel interface (IF) unit 113 controls communication with an operation panel 114. Serving as a user interface (UI), it is possible to check various types of settings and statuses of the MFP by operating a liquid crystal display and buttons on the operation panel 114.

An HDD interface (IF) unit 115 controls communication with HDDs (storage devices) 117 compliant with the ATA standard. Each HDD 117 is a non-volatile mass storage device and is used as an area for storing files and for transitorily saving print data. Although the present embodiment is explained as using HDDs 117, the HDDs 117 may instead be replaced by other storage devices compliant with the ATA standard, such as SSDs.

In the present example of the system structure, the HDD IF unit 115 and each HDD 117 communicate via a RAID controller 116. The RAID controller 116 controls striping and mirroring using the plurality of HDDs 117. It should be noted that the present embodiment is described on the premise of mirroring.

A video interface (IF) unit 118 controls communication with a print unit 119 regarding commands/statuses and transfers print data to the print unit 119. Although not illustrated, the print unit 119 is constituted by a printer body, a paper feed system, and a paper discharge system. Primarily in accordance with command information received from the video IF unit 118, the print unit 119 prints an image on a paper (sheet) based on the print data. A control bus, a data bus, and a local bus between blocks are collectively represented by a system bus 120 for convenience.

Figure 2:
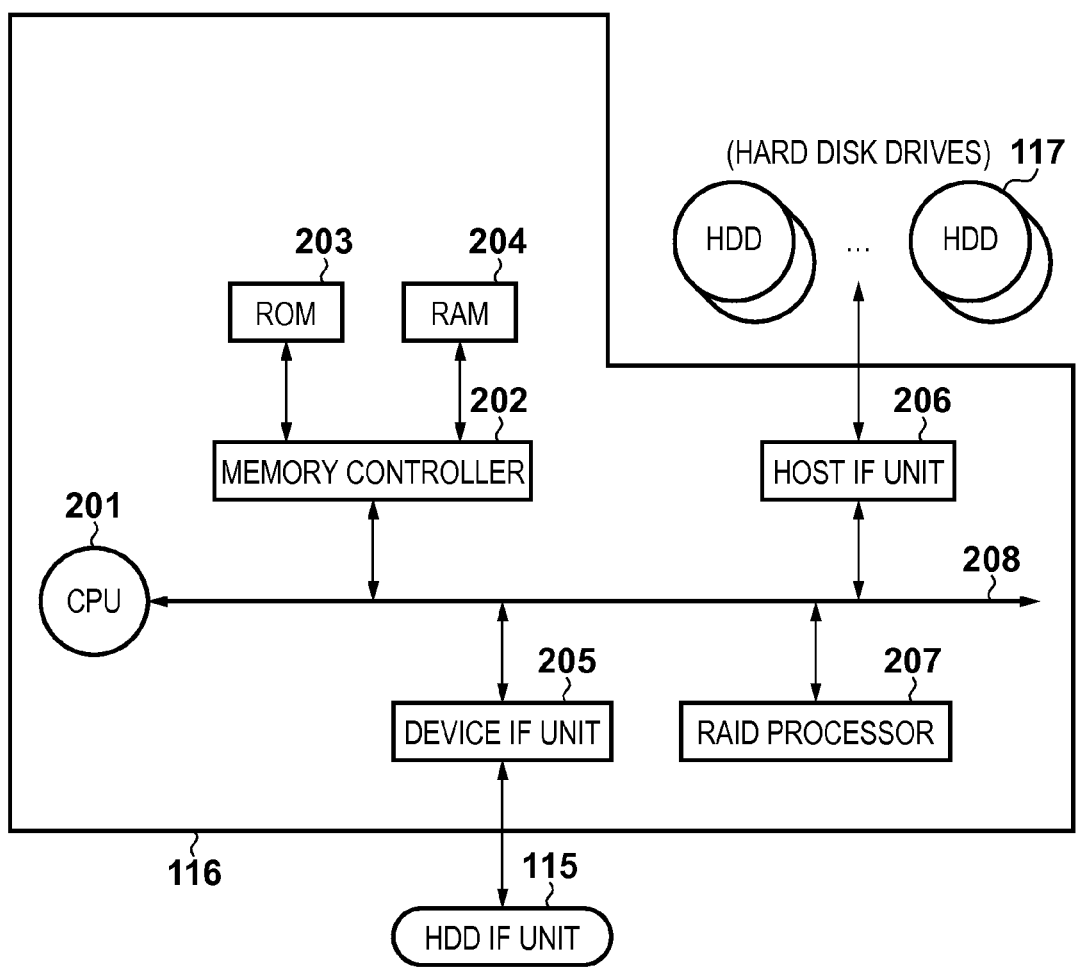
FIG. 2 is a block diagram showing an example of the internal structure of a RAID controller pertaining to the embodiment.

FIG. 2 is a block diagram showing an example of the internal structure of the RAID controller 116 pertaining to the present embodiment.

A CPU (central processing unit) 201 performs system control, RAID processing, calculation processing, ATA command processing, and the like. A memory controller 202 controls input, output, and DMA (direct memory access) with respect to various types of memory devices. A ROM 203 stores a boot program, various types of processing/control programs, and control parameters. A RAM 204 is used as, for example, a work area for programs, an area for transitorily saving data, and a register. A device interface (IF) unit 205 performs processing for ATA commands/protocols while representing itself as a storage device and considering the HDD IF unit 115 of the main controller in FIG. 1 as a host. On the other hand, a host interface (IF) unit 206 performs processing for ATA commands/protocols while considering the main controller as the host and the HDDs 117 as storage devices. A RAID processor 207 performs a mirroring process on data that the main controller writes to or reads from each HDD 117.

In an ordinary mirroring process, two HDDs (master and backup) having the same capacity are connected; the same data is written to the corresponding areas of the two HDDs during a writing operation, and the data is read from the master HDD out of the two HDDs during a reading operation. In this way, the two HDDs always hold the same data. Hence, even in the case of the failure of the master HDD whereby the data cannot be read from the master HDD, the same data is still preserved in the backup HDD. Furthermore, even if an abnormality occurs in the master HDD, a system breakdown can be avoided by switching to the backup HDD. A control bus, a data bus, and a local bus between blocks are collectively represented by a system bus 208 for convenience.

Based on the examples of the system structure explained above with reference to FIGS. 1 and 2, the following describes the details of the present embodiment.

FIG. 3 depicts a view illustrating an example of an ordinary structure in which a mirroring system is constructed using two HDDs.

A main controller 301 is connected to a mirroring controller board 302, which is an optional function, via a SATA cable 303 and a serial cable 304. A master HDD 305 and a backup HDD 306 are connected to the mirroring controller board 302 via SATA cables 307 and 308, respectively.

As mentioned earlier, when the main controller 301 performs data access, data is written to both of the master HDD 305 and the backup HDD 306 during a data writing operation, and the data is read only from the master HDD 305 during a data reading operation. If an attempt is made to access an area of an HDD other than a data area, i.e. in the case of a group of information acquisition commands and a group of security commands, which involve acquiring information from each individual HDD and configuring the settings of each individual HDD, corresponding processing is performed only on the master HDD 305 (the solid arrow 309 in FIG. 3). This is because with the group of commands defined by the SATA standard, it is impossible to access a selected one of the plurality of HDDs. Therefore, in order to acquire information from the backup HDD 306 and configure the settings of the backup HDD 306 individually, it was required to do so via a serial IF formed by the serial cable 304 (the dashed arrow 310 in FIG. 3).

FIG. 4 depicts a view illustrating a mirroring system pertaining to the present embodiment.

A main controller 401 is connected to a mirroring controller board 402 via a SATA cable 403. A master HDD 404 and a backup HDD 405 are connected to the mirroring controller board 402 via SATA cables 406 and 407, respectively. The system of FIG. 4 differs from that of FIG. 3 in not using the serial cable 304 as a dedicated communication line to connect the main controller 401 and the mirroring controller board 402.

Incidentally, SATA commands respectively comprise several transfer protocols and register values uniquely defined therefor. Representative examples of such transfer protocols include PIO-in, PIO-out, Non-data, DMA-in, and DMA-out. In addition, each SATA command is assigned a corresponding command code. Some commands are assigned command codes only, and have no transfer protocols and register values defined therein. Such commands are generally referred to as vendor-unique commands. The present embodiment utilizes an extended command which is uniquely created by setting, in an undefined command, transfer protocols defined by the SATA standard as well as unique register definitions.

FIG. 6 depicts a view illustrating examples of register values defined in an extended command.

A selection number 601, normal commands 1 through N, and pieces of information appended to the normal commands 1 through N are designated in the extended command. The selection number 601 is for selecting one of the plurality of HDDs. The normal commands 1 through N, which are defined by the SATA standard, are transmitted to the selected HDD. The pieces of information appended to the normal commands 1 through N are, for example, subcommands 1 through N. In FIG. 6, reference numerals 602 through 607 are given to the normal commands 1 through N and the subcommands 1 through N.

Each subcommand is auxiliary information that is used when, for instance, selecting a specific item defined by the corresponding normal command. The number of normal commands 602, 604 and 606 and the number of subcommands 603, 605 and 607 may be any number greater than or equal to one. The subcommands, which are appended to the normal commands, may be designated according to the necessity of control. That is, the subcommands may be omitted if unnecessary.

An available count 608 and an available flag 609 are also set in the extended command. An available count is a maximum count (M) of access that can be made to the selected HDD by using the designated normal commands 602, 604 and 606. Any value in a range of one to infinity may be suitably set as the maximum count (M). In order to set infinity as the maximum count (M), the available count 608 should be set to "0". For example, in order to permit any count of access to the selected HDD during a certain time period instead of designating an available count, the available count 608 should be set to "0", and the available flag 609 should be set to "1" so as to indicate that the selected HDD is accessible.

In this case, however, in order to terminate an accessible time period in which the selected HDD is accessible, it is required to reissue an extended command in which the available flag 609 is set to "0" so as to invalidate access to the selected HDD. Note that when control is performed solely based on the accessible time period without designation of an access count, the available count 608 is dispensable and control can be performed only with the available flag 609. On the other hand, when the count of access to the selected HDD is limited to one, that is, when multiple accesses to the selected HDD are not allowed, neither the available count 608 nor the available flag 609 is necessary. Hereinafter, an extended command defined by its contents is referred to as a Select Channel command.

In the present embodiment, driver software installed in the main controller 401 issues a Select Channel command to the mirroring controller board 402 as indicated by the arrow 409 in FIG. 4. As a result, a path 410 is formed via which access can be made to the selected backup HDD 405 by using the designated normal commands for the designated count (or for a certain time period). Other normal commands are processed by way of an access path 408 to the master HDD 404.

Figure 5A:
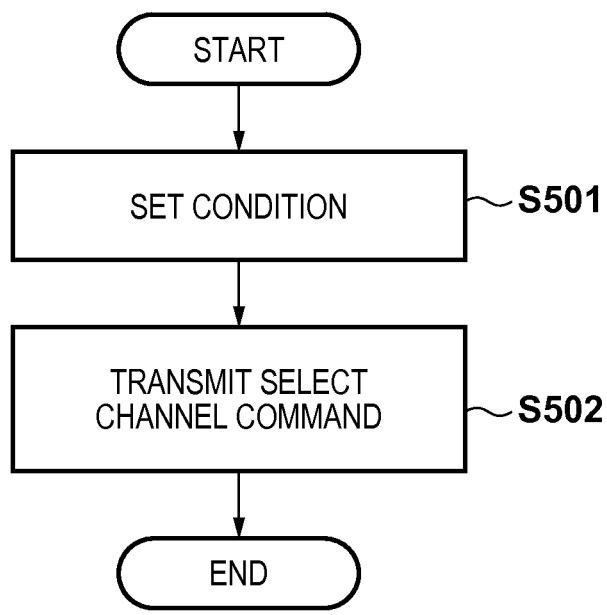
FIG. 5A is a flowchart for describing processing performed by a main controller of the MFP pertaining to the embodiment.

FIG. 5A is a flowchart for describing processing performed by the main controller of the MFP pertaining to the present embodiment. This processing is executed by a program stored in the ROM 103. At the time of the execution of this processing, the program runs under control of the CPU 101 after being deployed to the RAM 104. Below, this processing is described on the premise that normal commands defined by the SATA standard, such as information acquisition commands and security commands, are issued to the selected HDD (in the present embodiment, the backup HDD 405) with the configuration shown in FIG. 4.

First, in a condition setting process of step S501, the driver software installed in the main controller 401 sets the selection number 601, the normal commands and auxiliary information 602 to 607, the available count 608, and the available flag 609 in the register of the Select Channel command. Next, the processing advances to step S502 where the driver software transmits the Select Channel command thus defined to the mirroring controller board 402.

Figure 5B:
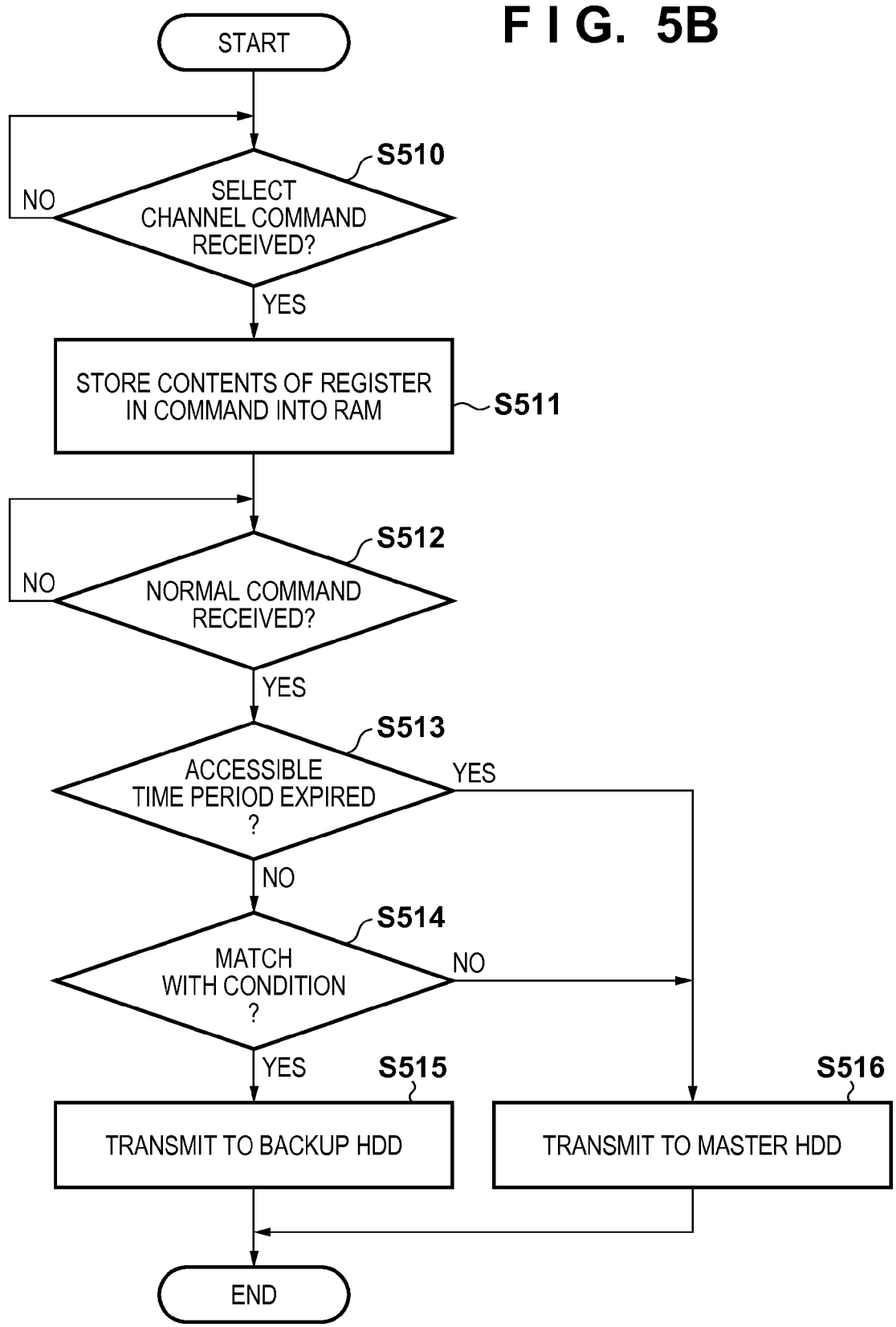
FIG. 5B is a flowchart for describing control processing performed by a central processing unit (CPU) of the RAID controller pertaining to the embodiment.

FIG. 5B is a flowchart for describing control processing performed by the CPU 201 of the RAID controller 116 pertaining to the present embodiment. This processing is executed by a program stored in the ROM 203, and the program runs under control of the CPU 201.

First, in step S510, the CPU 201 waits for reception of the Select Channel command transmitted in step S502 of FIG. 5A. Upon reception of the Select Channel command, the processing advances to step S511 where the contents of the register in the Select Channel command are stored in the RAM 204. Thereafter, the processing proceeds to step S512 where the CPU 201 waits for reception of the normal commands 602, 604 and 606 designated in the Select Channel command. Note that these normal commands are limited to commands for acquiring information from the selected HDD and configuring the settings of the selected HDD. As has been described above with reference to FIG. 4, the present description is given under the precondition that a group of normal commands involving writing data to and reading data from a data area is all transmitted to the master HDD 404.

When the designated normal commands 602, 604 and 606 are received in step S512, the processing advances to step S513 where the CPU 201 determines whether or not the condition set in the extended command is satisfied. More specifically, the CPU 201 determines whether or not the designated available count 608 is yet to be reached, and whether or not the available flag 609 is on. Although not illustrated, when an available count is designated as has been described above, the CPU 201 determines whether or not the available count has been reached, and if not reached, increments the value of an internal counter. On the other hand, when an accessible time period is designated as has been described above, the CPU 201 determines whether or not the available flag 609 is on (the selected HDD is accessible) or off (the selected HDD is not accessible). In this case, the CPU 201 performs the determination as to the accessible time period on the premise that the received Select Channel command is for switching from a state where the selected HDD is accessible to a state where the selected HDD is not accessible.

When the result of the determination in step S513 indicates that the selected HDD is accessible, the processing advances to step S514 where the CPU 201 further compares the contents of the designated subcommands (pieces of auxiliary information) with the corresponding conditions and determines whether or not the contents of the subcommands match the corresponding conditions. When the CPU 201 determines affirmatively in step S514 as a result of comparison, the processing advances to step S515 where the CPU 201 transmits the received normal commands to the backup HDD 405.

On the other hand, when the CPU 201 determines in step S513 that the selected HDD is not accessible due to expiration of the accessible time period or the like, or when the CPU 201 determines negatively in step S514 as a result of comparison, the processing proceeds to step S516 where the CPU 201 transmits the received normal commands to the master HDD 404.

As set forth in the present embodiment, the use of the Select Channel command makes it possible to form a path via which designated normal commands are transmitted to the selected HDD for a desired time period. This allows acquiring information from each individual HDD and configuring the settings of each individual HDD. Furthermore, while processing is performed with respect to the selected HDD, i.e., during the accessible time period, other normal commands are all transmitted to the master HDD 404 without the main controller having to switch between the HDDs. This has the advantageous effect of efficiently processing accesses to the HDDs as a whole.

For an MFP equipped with a plurality of storage devices, the present embodiment allows acquiring information from each individual storage device and configuring the settings of each individual storage device by using an ordinary interface compliant with the SATA standard without using a dedicated communication line. The present embodiment can also simplify the process of attaching an optional apparatus to be connected to the interface.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-126702, filed Jun. 6, 2011, which is hereby incorporated by reference herein in its entirety.

What is claimed is:

1. An information processing apparatus equipped with a plurality of storage devices compliant with an advanced technology attachment (ATA) standard, the information processing apparatus comprising:
    a control unit configured to control the plurality of storage devices;
    a setting unit configured to set at least a selection number and one or more types of normal commands in a unique extended command defined in compliance with the ATA standard, the selection number specifying one of the plurality of storage devices; and
    a condition setting unit configured to set, in the unique extended command, a condition for accessing the one storage device specified by the selection number,
    wherein the control unit includes:
    a holding unit configured to receive the unique extended command and hold settings contained in the unique extended command; and
    a transmission unit configured to, upon receiving any of the normal commands, determine whether or not the condition held in the holding unit is satisfied, and when the transmission unit determines that the condition is satisfied, transmit the received normal command to the one storage device specified by the selection number, and when the transmission unit determines that the condition is not satisfied, transmit the received normal command to another one of the plurality of storage devices serving as a master.

2. The information processing apparatus of claim 1, wherein the condition is a count of transmission of the received normal command to the one storage device specified by the selection number.

3. The information processing apparatus of claim 1, wherein the condition is a time period in which the received normal command is transmitted to the one storage device specified by the selection number.

4. A control method for controlling an information processing apparatus equipped with a plurality of storage devices compliant with an advanced technology attachment (ATA) standard, the control method comprising:
    a setting step of setting at least a selection number and one or more types of normal commands in a unique extended command defined in compliance with the ATA standard, the selection number specifying one of the plurality of storage devices;
    a condition setting step of setting, in the unique extended command, a condition for accessing the one storage device specified by the selection number;
    a holding step of receiving the unique extended command and holding settings contained in the unique extended command; and
    a transmission step of, upon receiving any of the normal commands, determining whether or not the condition held in the holding step is satisfied, and when the transmission step determines that the condition is satisfied, transmitting the received normal command to the one storage device specified by the selection number, and when the transmission step determines that the condition is not satisfied, transmitting the received normal command to another one of the plurality of storage devices serving as a master.

5. An information processing apparatus to which a plurality of storage devices compliant with a standard are connected, the information processing apparatus comprising:
a processing unit configured to process data; and
a control unit configured to control the plurality of storage devices,
wherein the processing unit sets selection information for selecting a storage device, among the plurality of storage devices, to be accessed by the control unit and designation information for designating a normal command to be processed by the control unit using the selection information, in an extended command defined in compliance with the standard, and transmits the extended command to the control unit,
wherein the control unit receives the extended command and holds the selection information and the designation information set in the extended command,
wherein when the control unit receives the normal command from the processing unit, the control unit determines whether or not the normal command matches the designation information, and
wherein when the control unit determines that the normal command matches the designation information, the control unit executes access based on the normal command to a storage device of the plurality of storage devices corresponding to the selection information.

6. The information processing apparatus of claim 5, wherein when the control unit determines that the normal command matches the designation information, the control unit executes access based on the normal command to a backup storage device, among the plurality of storage devices.

7. The information processing apparatus of claim 5, wherein when the control unit determines that the normal command does not match the designation information, the control unit executes access based on the normal command to a master storage device, among the plurality of storage devices.

8. The information processing apparatus of claim 5, wherein when a count of accesses based on the normal command to a storage device corresponding to the selection information reaches a predetermined value, the control unit does not execute the access based on the normal command to the storage device corresponding to the selection information.

9. The information processing apparatus of claim 5, wherein when a time period elapsing after the access based on the normal command to the storage device corresponding to the selection information reaches a predetermined value, the control unit does not execute the access based on the normal command to the storage device corresponding to the selection information.

10. The information processing apparatus of claim 5, wherein the standard is an advanced technology attachment (ATA) standard.

11. The information processing apparatus of claim 5, wherein the plurality of storage devices consist of a first storage device and a second storage device.

12. An information processing apparatus to which a plurality of storage devices compliant with a standard are connected, the information processing apparatus comprising:
a processing unit configured to process data; and
a control unit configured to control the plurality of storage devices,
wherein the control unit holds selection information for selecting a storage device, among the plurality of storage devices, to be accessed by the control unit and designation information for designating a normal command to be processed by the control unit using the selection information, and
wherein when the control unit receives a normal command from the processing unit, the control unit determines whether or not the normal command matches the designation information, and
wherein when the control unit determines that the normal command matches the designation information, the control unit executes access based on the normal command to a storage device corresponding to the selection information.

* * * * *